US011612842B2

(12) United States Patent
Sullivan et al.

(10) Patent No.: US 11,612,842 B2
(45) Date of Patent: Mar. 28, 2023

(54) FILTER LID (71) Applicant: simple PULSE, LLC, Monroe, OR (US)

(72) Inventors: Jesse Daniel Sullivan, Monroe, OR (US); Cristen Renae Sullivan, Monroe, OR (US); Hugo Rodriguez, Lake Oswego, OR (US)

(73) Assignee: SIMPLE PULSE, LLC, Monroe, OR (US)

( * ) Notice: Subject to any disclaimer, the term of this patent is extended or adjusted under 35 U.S.C. 154(b) by 158 days.

(21) Appl. No.: 17/118,325

(22) Filed: Dec. 10, 2020

(65) Prior Publication Data

US 2021/0178299 A1    Jun. 17, 2021

Related U.S. Application Data (60) Provisional application No. 62/947,368, filed on Dec. 12, 2019.

(51) Int. Cl.
*B01D 35/30*    (2006.01)

(52) U.S. Cl.
CPC ........ *B01D 35/30* (2013.01); *B01D 2201/291* (2013.01); *B01D 2201/302* (2013.01); *B01D 2201/304* (2013.01)

(58) Field of Classification Search
CPC .............. B01D 35/30; B01D 2201/291; B01D 2201/302; B01D 2201/304; B01D 29/01
USPC ....... 210/464–470, 473, 474, 477, 244, 450, 210/514, 435, 439–446
See application file for complete search history.

(56) References Cited

U.S. PATENT DOCUMENTS 5,198,104 A * 3/1993 Menyhert ................ B01D 1/22
196/115

\* cited by examiner

*Primary Examiner* — Madeline Gonzalez (57) ABSTRACT

The instant disclosure seeks to provide a container lid that allows a liquid to be filtered, carried, and poured using the same lid. The container filter lid includes a lid body, filter material, and filter cap. The filter cap is demountably coupled the lid body. The filter cap includes a top surface. The filter material is positioned between the filter cap and the lid body. The lid body includes a first port. The filter cap includes a second port. The filter cap includes a filter reservoir. The filter reservoir extends from the filter cap opposite the top surface. The filter material is positioned adjacent to the filter reservoir. The filter reservoir is positioned between the top surface and the filter material. The lid body includes a pour spout. The pour spout is positioned opposite the first port. The container filter lid also includes a filter cap gasket.

6 Claims, 9 Drawing Sheets

FILTER LID

CROSS-REFERENCE TO RELATED APPLICATIONS

This application claims priority to U.S. Provisional Application No. 62/947,368 filed Dec. 12, 2019, which is hereby incorporated herein by reference.

FIELD OF THE INVENTION

The present disclosure relates generally to container lids. More specifically, the present disclosure describes filter lids.

BACKGROUND OF THE INVENTION

There are many containers and/or systems that allow connections between dairy tubing and containers. Such containers and/or systems facilitate carrying or connecting and filtering or connecting and pouring. Many containers have carrying handles as well as, for example, devices for in-line milk filtration. Such devices for filtering milk in-line are generally large and bulky, which can weigh down milk transport lines and make them impractical for milking a small herd of dairy animals. There are lids available that have ports for milking purposes. For example, these lids fit on a wide range of containers from mason jars to 6-gallon buckets. There is a need for lids that allow for milking, filtering, carrying, and pouring all built into the same lid.

BRIEF DESCRIPTION OF THE DRAWINGS

Some of the embodiments will be described in detail, with reference to the following figures, wherein like designations denote like members, wherein.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "dorsal" refers to positions that are located near, on, or towards the upper or top side of a structure.

The present disclosure includes many aspects and features. Moreover, while many aspects and features relate to, and are described in the context of filtering lids, embodiments of the present disclosure are not limited to use only in this context.

There are many containers and/or systems that allow connections between dairy tubing and containers. Such containers and/or systems facilitate carrying or connecting and filtering or connecting and pouring. Many containers have carrying handles as well as, for example, devices for in-line milk filtration. Such devices for filtering milk in-line are generally large and bulky, which can weigh down milk transport lines and make them impractical for milking a small herd of dairy animals. There are lids available that have ports for milking purposes. For example, these lids fit on a wide range of containers from mason jars to 6-gallon buckets. There is a need in the art for lids that allow for milking, filtering, carrying, and pouring all built into the same lid. The instant disclosure saves time as well as keeps milk in an enclosed area until it is placed into a storage container.

The instant disclosure is described in words and images in an embodiment specific to the dairy industry. The instant disclosure has many applications in food and beverage, medical, and other industries where fluids, gasses, or solids are transferred, filtered, carried, and poured. FIGS. 1-9 illustrate various views of a container filter lid ("filter lid"), generally 100, according to some embodiments. The components of the filter lid 100 discussed below could be made of plastic, elastic material, metals, composites, or other suitable materials. The filter lid 100 is preferably an apparatus that allows users in the dairy industry to connect a milking system for dairy animals to a container, filter the milk in-lid before it enters the container, carry the container to another location, and pour the milk into another container without removing the lid.

To be sure, the filter lid 100 allows milk to be filtered into a container utilizing components built therein. In preferred embodiments, the filter lid 100 attaches to a container, for example, a 4" wide mouth gallon glass jar, and can be configured to fit many other types of containers utilizing various sealing mechanisms. The filter lid 100 preferably screws on to the top of container via internal threading 920. In preferred embodiments, the intended user of the filter lid 100 is someone who is milking less than 20 animals but more specifically 1-5 animals. In other embodiments, the filter lid 100 is configured to fit containers that are less than 6 gallons and specifically a 1-gallon glass jar. In general, the filter lid 100 works with countless types of systems and processes but is specifically designed for use in a professional home milking system.

The filter lid 100 saves time; produces improved results compared to other lids known in the art; and be less expensive compared to other processes to achieve the same results. The filter lid 100 saves time because filtering and collecting are done at the same time, and there are less items to clean and less components to purchase to replace worn equipment. The filter lid 100 produces better results because outside factors (e.g., contaminants, humidity, etc.) are less likely to affect the filtered product due to the closed nature of the system. The pouring feature of the filter lid 100 results in a cleaner process. The filter lid 100 is a less expensive option compared to other products because it reduces the need for additional components or equipment (e.g., strainer baskets, funnels, and secondary containers) to be purchased, maintained, and/or replaced. The filter lid 100 includes a lid body 105, a lid body gasket 210, filter material 300, and a filter cap 110.

Figure 1:
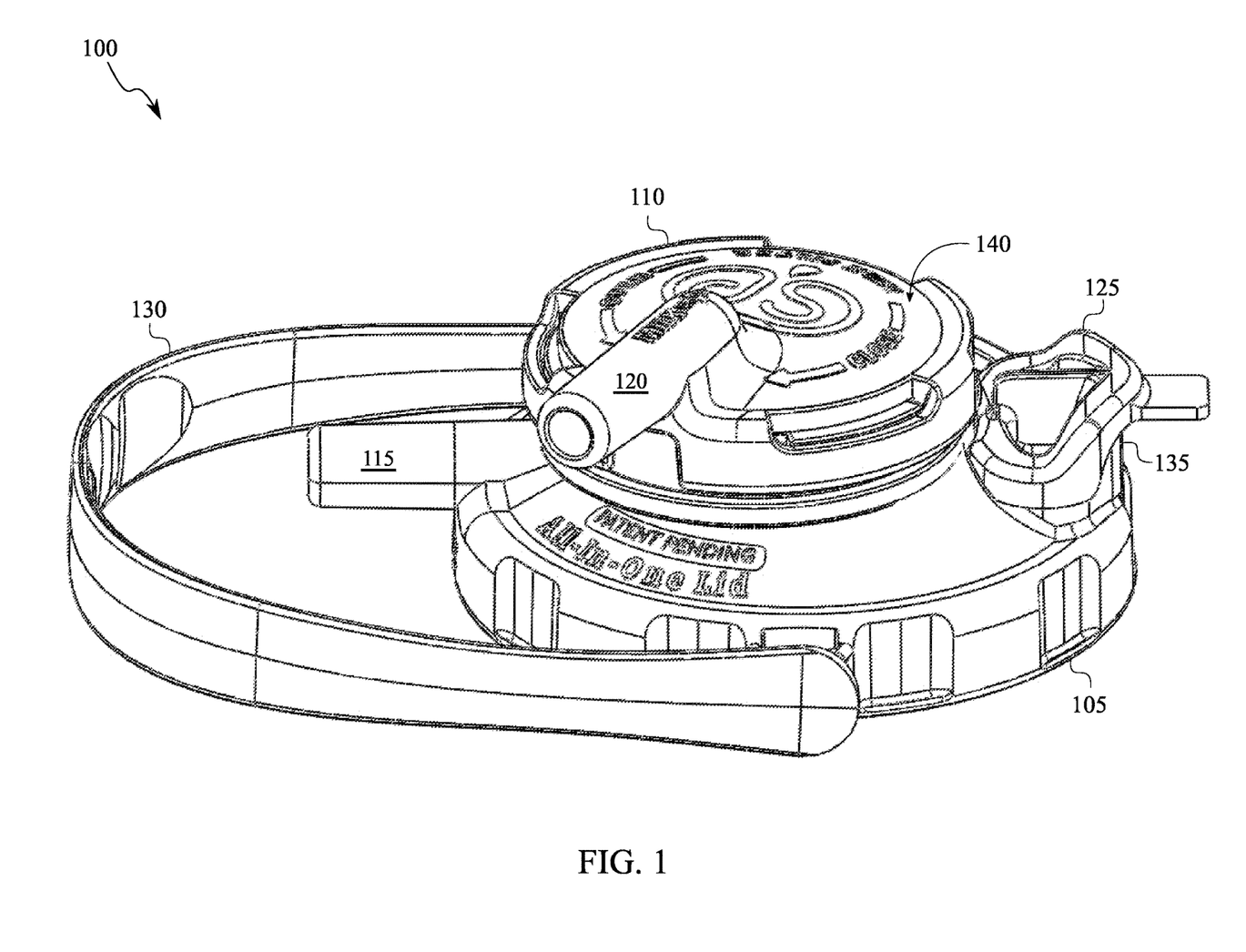
FIG. 1 illustrates a top perspective view of a container filter lid ("filter lid"), according to some embodiments.
Figure 2:
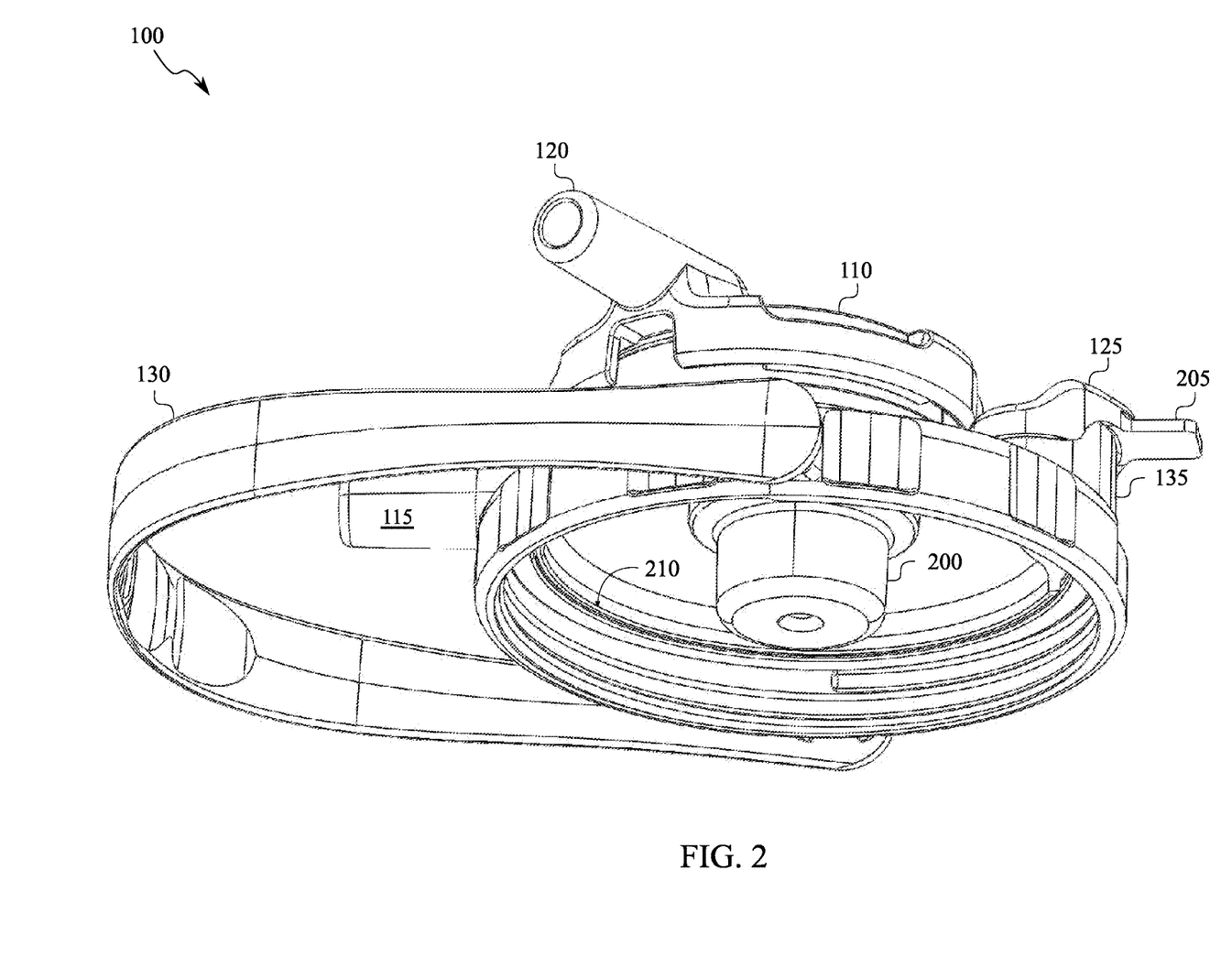
FIG. 2 illustrates bottom perspective view of the filter lid, according to other embodiments.
Figure 3:
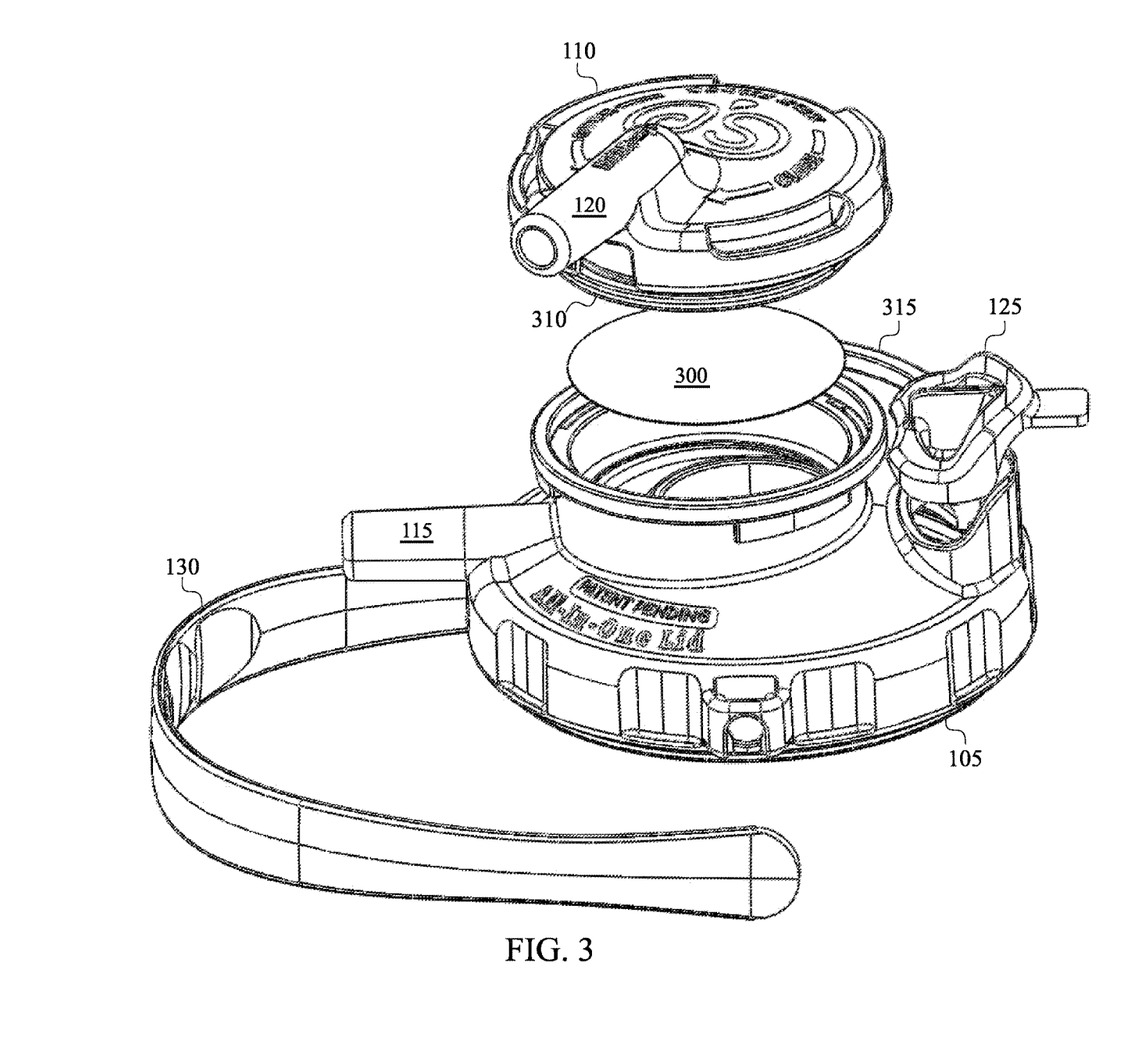
FIG. 3 illustrates an exploded view of the filter lid, according to certain embodiments.

As reflected in FIG. 2, the lid body gasket 210 is positioned adjacent to and within to the lid body 105. The filter cap 110 is preferably demountably coupled the lid body 105. As shown in the FIGS., the filter cap 110 can also be attached at different locations to the lid body 105. As reflected in FIG. 3, the filter material 300 is positioned between the filter cap 110 and the lid body 105. The filter material 300 can be made of wire mesh materials, natural materials, man-made fibers, composites, aggregate materials, or a combination of two or more thereof. In other embodiments, the filter material 300 is made up of several layers of filter material 300. The lid body 105 includes a first port 115. The filter cap 110 includes a second port 120. The first port 115 preferably extends laterally from the lid body 105. The second port 120 extends laterally from a top surface 140 of the filter cap 110. In other words, the filter cap 110 includes the top surface 140. The position of the first port 115 and the second port 120 can be varied and oriented in various directions and of various dimensions depending on application specific requirements.

Figure 4:
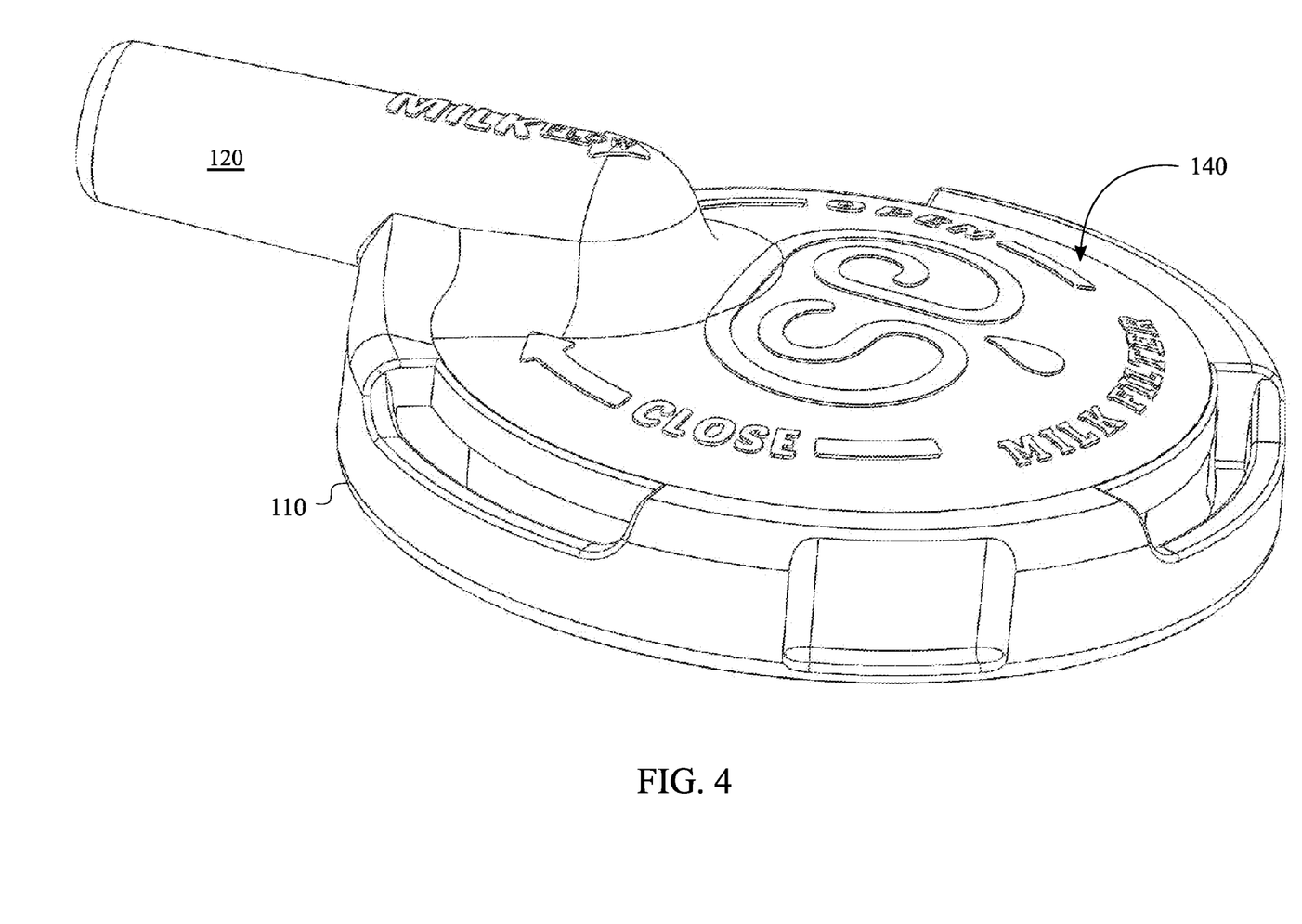
FIG. 4 illustrates a top perspective view of a filter cap of the filter lid, according to yet still other embodiments.
Figure 5:
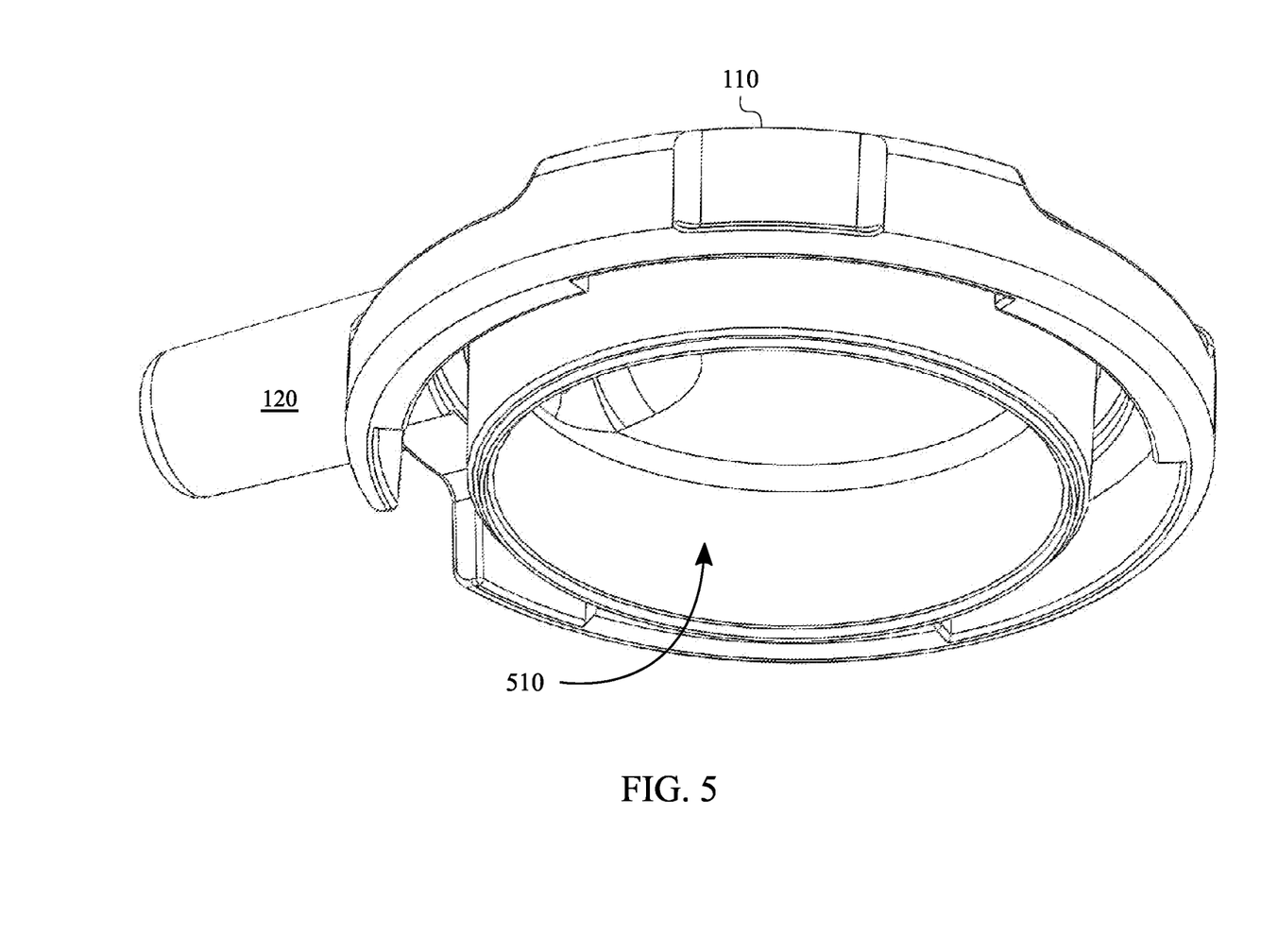
FIG. 5 illustrates a bottom perspective view of the filter cap, according to some embodiments.
Figure 6:
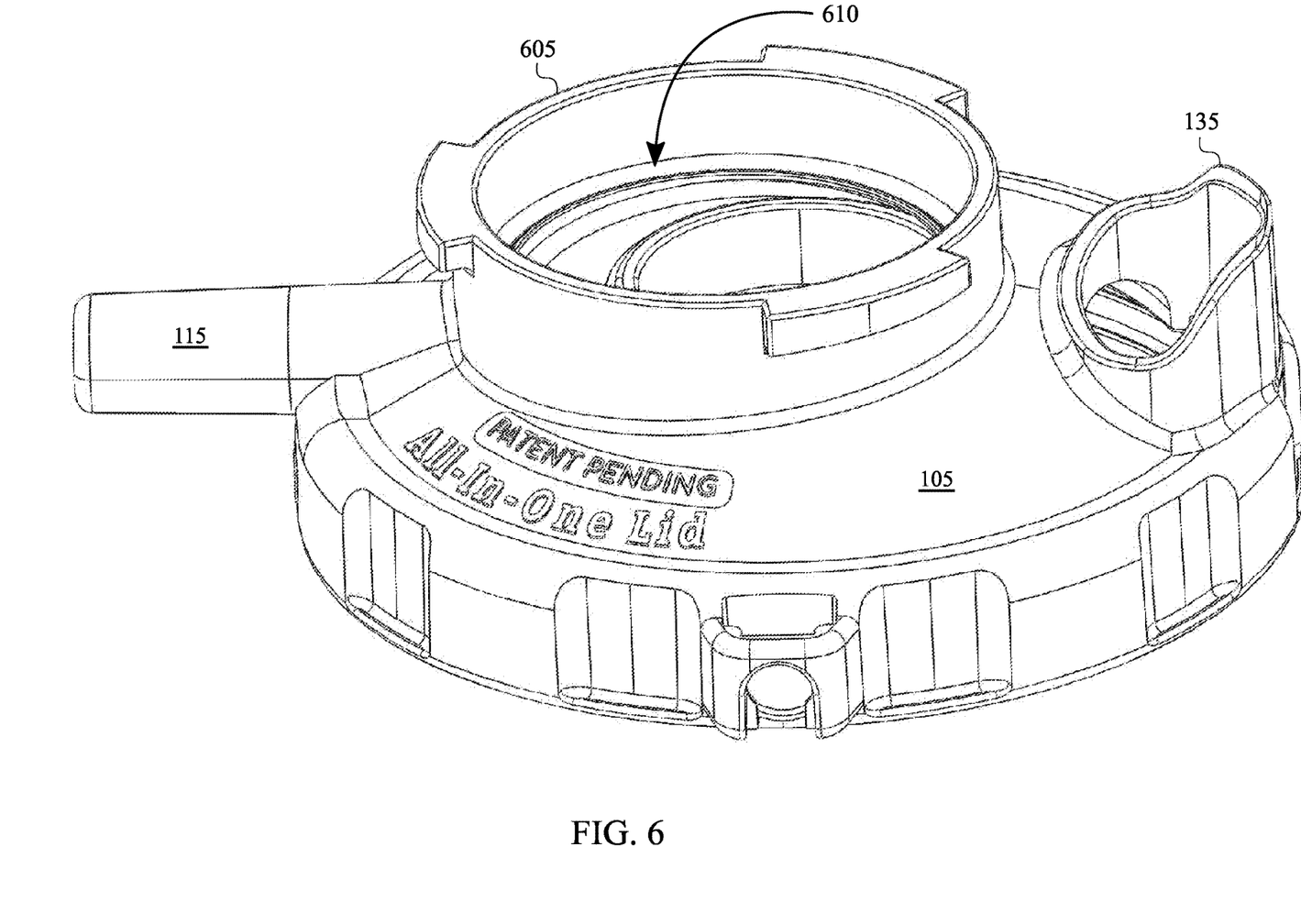
FIG. 6 illustrates top perspective view of a lid body of the filter lid, according to other embodiments.

FIGS. 4 and 5 depict perspective views of the filter lid 100, according to yet still other embodiments. The filter cap 110 preferably includes a filter reservoir 510. The filter cap 110 acts as a cap for the filter material 300. The filter reservoir 510 preferably extends from the filter cap 110 opposite the top surface 140. The filter material 300 is positioned adjacent to the filter reservoir 510. The filter reservoir 510 is positioned between the top surface 140 and the filter material 300. The lid body 105 comprises a pour spout 135. The pour spout 135 is preferably positioned opposite the first port 115. In some embodiments, the filter lid 100 includes a filter cap gasket 310. The filter cap gasket 310 is positioned adjacent to and between the lid body 105 and the filter cap 110. The filter cap gasket 310 is positioned proximate to the filter reservoir 510.

The lid body 105 includes a spout 200. The spout 200 is positioned proximate to the filter material 300. The spout 200 preferably has an overall conical shape. The spout 200 extends from the lid body 105 opposite the filter cap 110. The spout 200 is preferably configured as an anti-foaming component. Not to be limited by theory, when used with a milk collection container, the spout 200 reduces the amount of foaming caused by agitation of the milk during the milking process. The spout 200 restricts the volume of milk that moves through the filter lid 100 to reduce the amount of foam in container.

Figure 9:
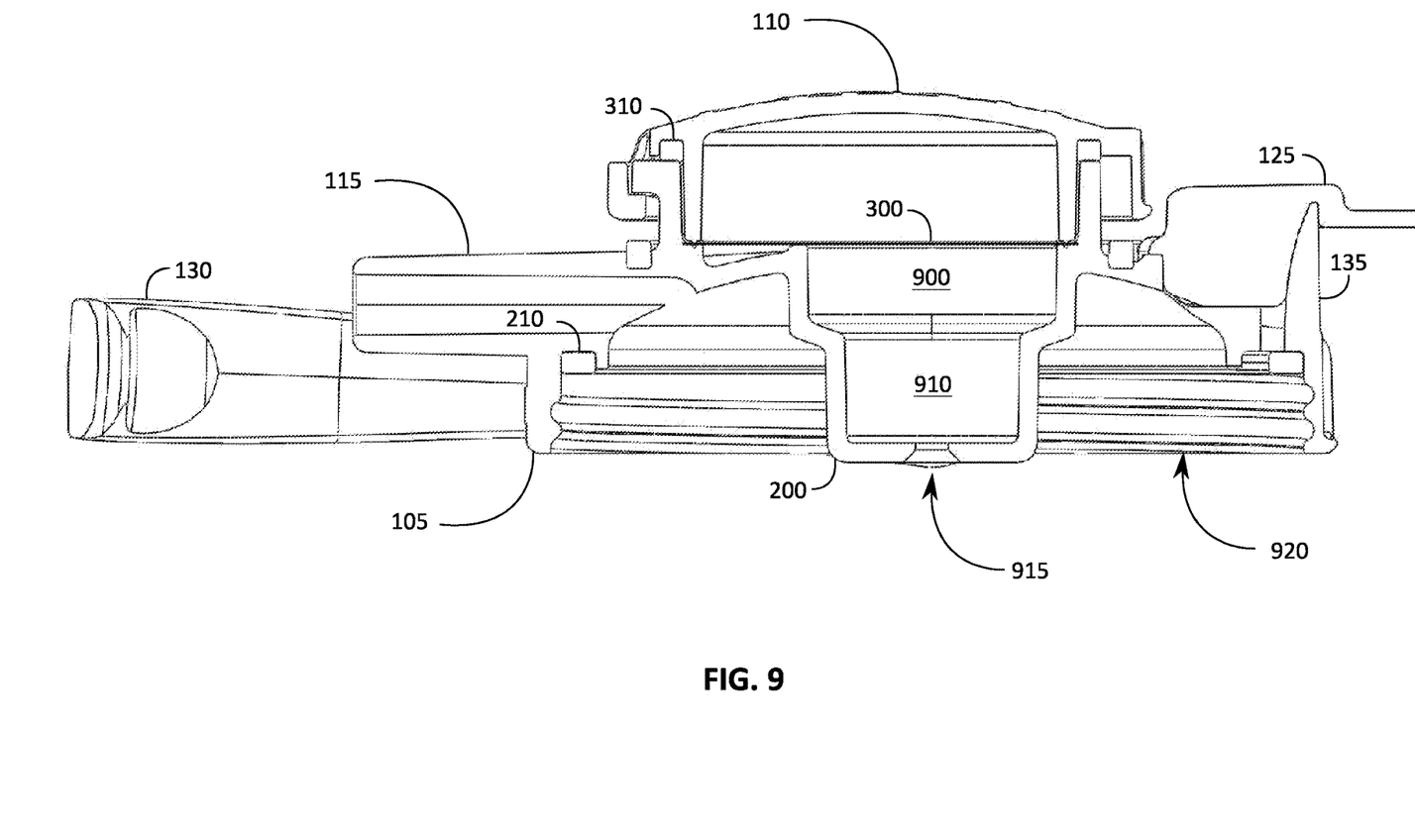
FIG. 9 illustrates a side cut-through view of the filter lid, according to some embodiments.

The restricted flow allows the milk to enter the collection container at a higher velocity compared to an unrestricted flow. The restricted opening of the spout 200 results in a milk spraying action which disturbs any foam (e.g., pops the foam bubbles) present in the container and allows the container to be filled with a greater amount of milk before foam exits the first port 115. The spout 200 preferably includes a first section 900 positioned above and adjacent to a second section 910. The first section 900 is wider compared to the second section 910 (i.e. greater circumference). The first section 900 and the second section 910 each have an overall tubular shape. The second section 910 includes an orifice 915. The orifice 915 is centrally positioned on the second portion 910.

Figure 7:
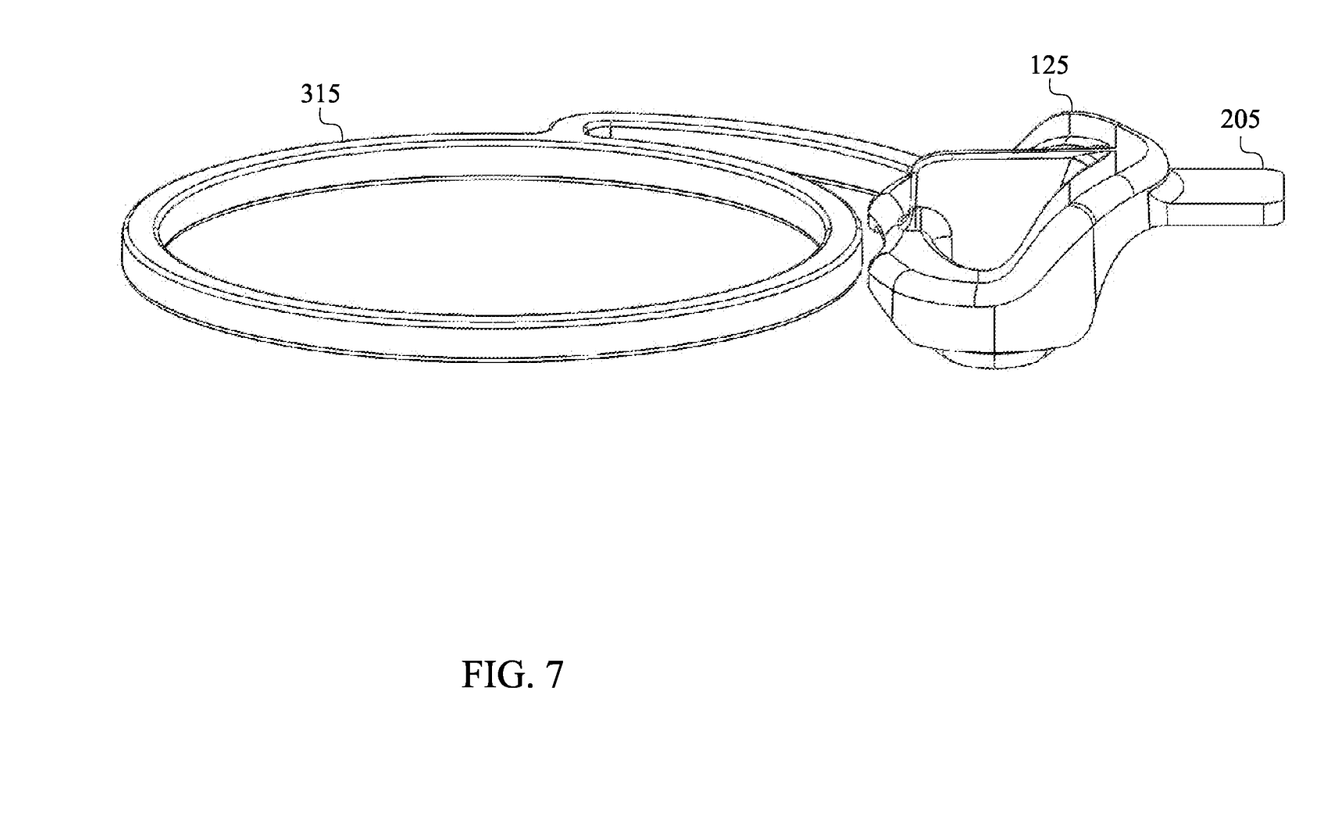
FIG. 7 illustrates a perspective view of a pour spout plug of the filter lid, according to certain embodiments.
Figure 8:
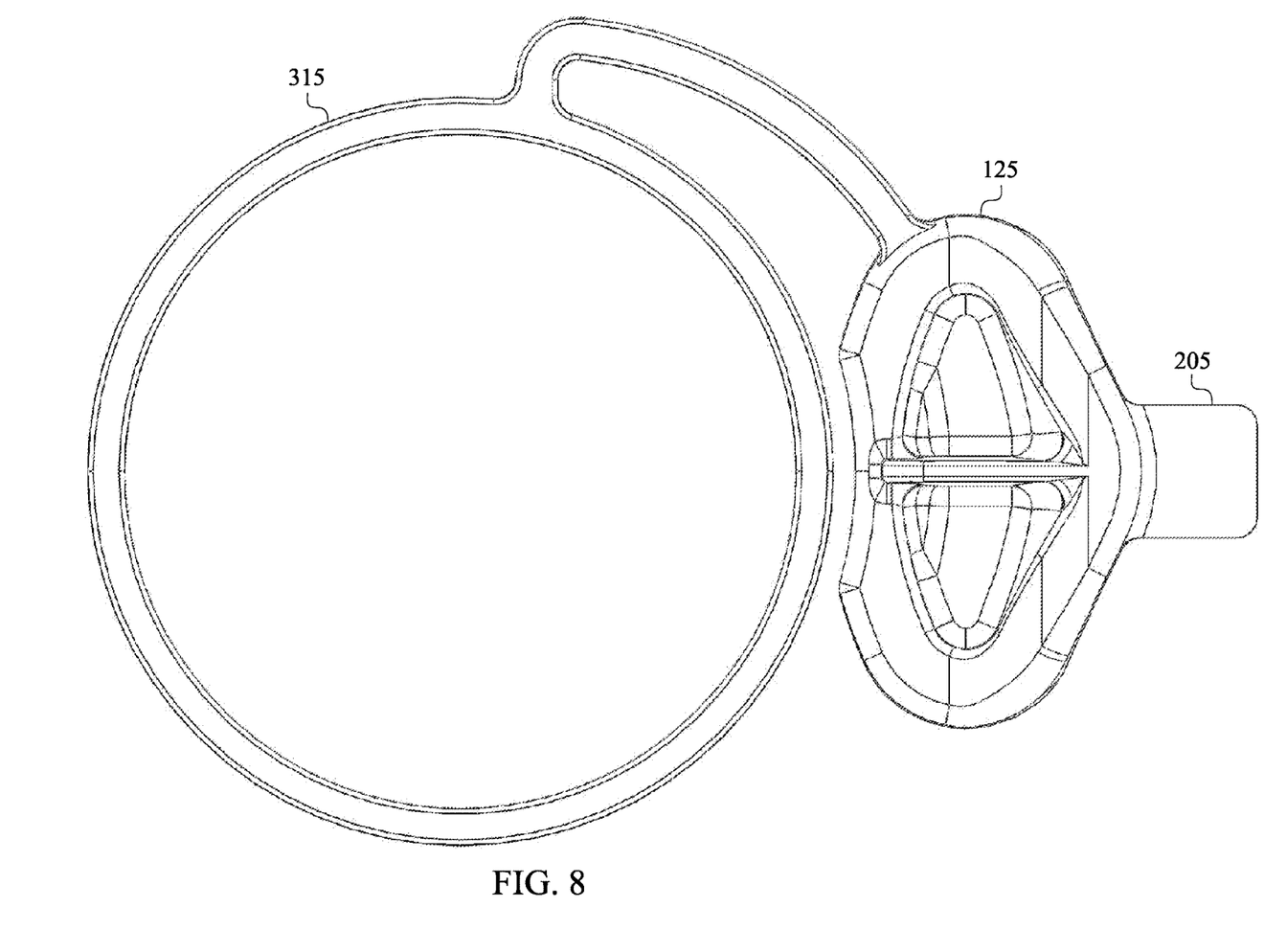
FIG. 8 illustrates a top view of the pour spout plug, according to yet still other embodiments.

In preferred embodiments, the filter lid 100 includes a carrying handle 130. The carrying handle 130 is rotatably attached to the lid body 105. The carrying handle 130 can be attached in different locations on the lid body 105 and be of various sizes and shapes depending on the user and/or container contents. The filter lid 100 includes a pour spout plug 125. The pour spout 135 can include any shape that facilitates one or more embodiments disclosed herein (e.g., round, oval, rectangular, polygonal, an irregular geometry, or a combination of two or more thereof). The pour spout plug 125 is demountably positioned in the pour spout 135. The pour spout plug 125 is demountably coupled to the lid body 105 via a retention apparatus 315. The pour spout plug 125 includes a tab 205. In preferred embodiments, the tab 205 extends from a lateral side of the pour spout plug 125. The tab 205 can facilitate the manipulation of the pour spout plug 125.

The filter lid 100 can be used in a variety of ways. In preferred embodiments, a regulated vacuum source can be applied to the first ports 115. The filter material 300 is placed into the filter reservoir 510, and the filter cap 110 is secured to the lid body 105 in one of three locking locations. A transport hose can be attached to the second port 120 on the filter cap 110. As milk is expressed from a dairy animal, it travels through the transport hose and enters the filter cap 110. The milk is then filtered by the filter material 300 and settles into the container. The process continues until the container is full or the animal is done expressing milk. When the container is ready to be poured into a storage container, the user disconnects the vacuum and transport lines, picks up the filter lid 100 and container by the carrying handle 130, and transports it to another location. The user then removes the pour spout plug 125 while securing it out of the way and pours off the milk into a storage container while holding onto the carrying handle 130 and container. The user can then continue the process of expressing milk, filtering the milk, and pouring it off until they are done. The filter lid 100 can be cleaned and sanitized by removing the filter cap 110 and the used filter material 300. In the same vein, the lid body gasket 210 and the filter cap gasket 310 can be removed for further cleaning and sanitation.

Although the disclosure has been explained in relation to its preferred embodiment, it is to be understood that many other possible modifications and variations can be made without departing from the spirit and scope of the disclosure.

What is claimed is:

1. A container filter lid comprising:
 a lid body;
 a filter material;
 a filter cap;
 wherein
  the filter cap is demountably coupled the lid body;
  the filter cap comprises a top surface;
  the filter material is positioned between the filter cap and the lid body;
  the lid body comprises a first port;
  the filter cap comprises a second port;
  the filter cap comprises a filter reservoir;
  the filter reservoir extends from the filter cap opposite the top surface;
  the filter material is positioned adjacent to the filter reservoir;
  the filter reservoir is positioned between the top surface and the filter material;
  the lid body comprises a pour spout;
  the pour spout is positioned opposite the first port;
  a filter cap gasket;
  the filter cap gasket is positioned adjacent to and between the lid body and the filter cap;
  the filter cap gasket is positioned proximate to the filter reservoir;
  the lid body comprises a spout;
  the spout is positioned proximate to the filter material;
  the spout extends from the lid body opposite the filter cap;
  a carrying handle;
  the carrying handle is rotatably attached to the lid body;
  a pour spout plug;
  the pour spout plug is demountably positioned in the pour spout;
  the pour spout plug is demountably coupled to the lid body via a retention apparatus;
  the lid body comprises an internal threading; and
  the internal threading is perimetrically disposed within the lid body.

2. The container filter lid of claim 1, further comprising:
 a lid body gasket; and
 wherein the lid body gasket is positioned adjacent to and within the lid body.

3. The container filter lid of claim 2, wherein the first port extends laterally from the lid body.

4. The container filter lid of claim 3, wherein the second port extends laterally from the top surface.

5. The container filter lid of claim 4, wherein the spout comprises:
 a first section;
 a second section;
 an orifice;
 the first section is positioned adjacent to the second section;
 the first section and the section each comprise an overall tubular shape;
 the first section comprises a greater circumference compared to the second section;
 the second section comprises the orifice; and
 the orifice is chamfered.

6. A container filter lid, comprising:
 a lid body;
 a lid body gasket;
 a filter material;
 a filter cap;
 wherein
  the lid body gasket is positioned adjacent to and within to the lid body;
  the filter cap is demountably coupled the lid body;
  the filter material is positioned between the filter cap and the lid body;
  the lid body comprises a first port;
  the filter cap comprises a second port;
  the first port extends laterally from the lid body;
  the second port extends laterally from a top surface of the filter cap;
  the filter cap comprises a filter reservoir;
  the filter reservoir extends from the filter cap opposite the top surface;
  the filter material is positioned adjacent to the filter reservoir;
  the filter reservoir is positioned between the top surface and the filter material;
  the lid body comprises a pour spout;

the pour spout is positioned opposite the first port;
a filter cap gasket;
the filter cap gasket is positioned adjacent to and between the lid body and the filter cap;
the filter cap gasket is positioned proximate to the filter reservoir;
the lid body comprises a spout;
the spout is positioned proximate to the filter material;
the spout extends from the lid body opposite the filter cap;
a carrying handle;
the carrying handle is rotatably attached to the lid body;
a pour spout plug;
the pour spout plug is demountably positioned in the pour spout;
the pour spout plug is demountably coupled to the lid body via a retention apparatus;
the lid body comprises an internal threading; and
the internal threading is perimetrically disposed within the lid body.

\* \* \* \* \*